Feb. 1, 1938.  A. J. DESROSIERS  2,107,109
WATER BUBBLER
Filed April 22, 1937

Inventor
Albert J. Desrosiers
By Clarence A. O'Brien
Hyman Berman
Attorneys

Patented Feb. 1, 1938

2,107,109

UNITED STATES PATENT OFFICE 2,107,109

WATER BUBBLER

Albert Joseph Desrosiers, New Bedford, Mass.

Application April 22, 1937, Serial No. 138,456

1 Claim. (Cl. 210—84)

The object of my invention is to provide a water bubbler for drinking fountains, which can be readily attached to any threaded or non-threaded faucets.

It is a further objective of my invention to make a water bubbler which can be readily cleaned and will have transparent parts, so that foreign matter within it can be easily detected.

The above and various other objects and advantages of this invention will in part be described and in part be understood from the following detailed description of the present preferred embodiment, the said being illustrated in the accompanying drawing, wherein:—

Figure 1:
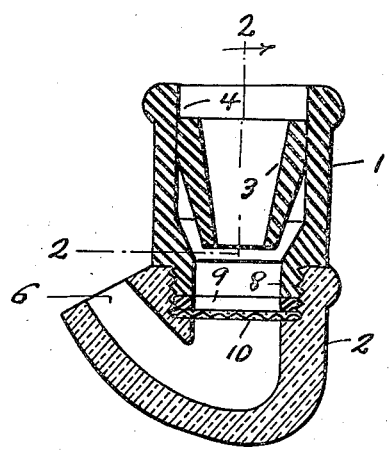
Figure 1 is a side elevated cross sectional view through the device.
Figure 2:
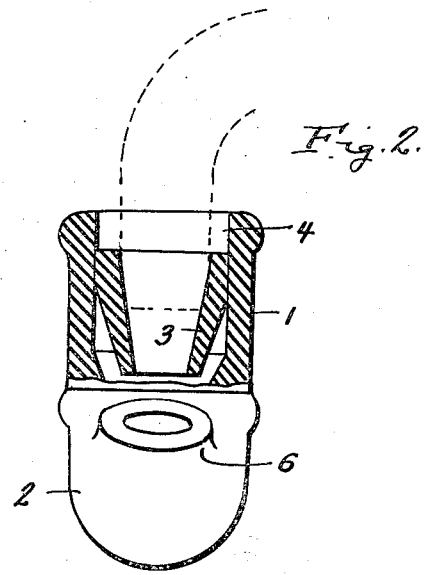
Figure 2 is a sectional view on the line 2—2 of Figure 1.
Figure 3:
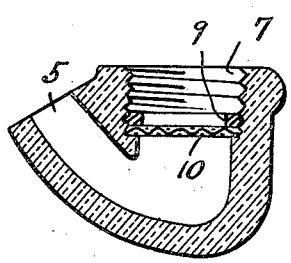
Figure 3 is a side elevated sectional view of the bubbler part showing the filter and washer.
Figure 4:
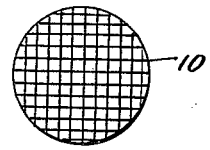
Figure 4 is a top view of the filter.

Referring now to the drawing in which, the numeral 1 designates the rubber part of the bubbler which engages the faucet. The rubber part 1 has for this purpose an upper seat 4, for the engagement of a threaded faucet end. A lower seat 3 is also constructed within the rubber part 1, for the purpose of engaging non-threaded faucets as shown in dotted lines in Figure 2. A glass part 2 with an upward turned duct 9 is fitted on to the rubber part by an internally threaded fitting 7 located on the engaging end of the glass part 2. The rubber part is engaged with the glass part 2 by a lower externally threaded end. A rubber washer 9 is used for securing a filter 10 within the glass part 2.

The operation or use of the device is to slip it on the end of the faucet, and when the water is turned on it will be directed upwardly and outwardly so that one can catch the water in his mouth.

The part 3 tapers downwardly and inwardly with its lower portion spaced from the main part 1, this space permitting the part 3 to expand when forced outwardly by a portion of a faucet.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

I claim:—

An attachment for a faucet comprising a substantially cylindrical rubber part, a downwardly tapered rubber part located in the first part and having its large end spaced from the upper end of the first part with its lower portion spaced from the internal walls of the first part, a body formed of transparent material having a passage therein which extends vertically from the upper end of the body downwardly to a point spaced from the lower end of the body and then extends upwardly and outwardly through an offset top part of the body, the upper end of the passage being threaded and the first rubber part having a reduced externally threaded part engaging the first-mentioned threaded part, the threaded part of the passage being larger than the rest of the passage to form a shoulder, a screen resting on the shoulder and a washer between the screen and the lower end of the rubber part.

ALBERT JOSEPH DESROSIERS.